United States Patent
Tukachinksy

(10) Patent No.: US 7,611,768 B2
(45) Date of Patent: Nov. 3, 2009

(54) SLIP-CLING STRETCH FILM

(75) Inventor: Alexander Tukachinksy, Jefferson, MA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 11/941,425

(22) Filed: Nov. 16, 2007

(65) Prior Publication Data

US 2008/0311366 A1    Dec. 18, 2008

Related U.S. Application Data

(63) Continuation-in-part of application No. 11/763,639, filed on Jun. 15, 2007.

(51) Int. Cl.
*B32B 7/02* (2006.01)
*B32B 27/32* (2006.01)

(52) U.S. Cl. .................... 428/212; 428/220; 428/411.1

(58) Field of Classification Search ............. 428/195.1, 428/212, 220, 411.1
See application file for complete search history.

(56) References Cited

U.S. PATENT DOCUMENTS

| | | |
|---|---|---|
| 2,668,988 A | 2/1954 | Bailey et al. |
| 3,576,051 A | 4/1971 | Click et al. |
| 4,073,782 A | 2/1978 | Kishi et al. |
| 4,082,877 A | 4/1978 | Shadle |
| 4,682,941 A | 7/1987 | Upmeier et al. |
| 4,996,094 A | 2/1991 | Dutt |
| 5,049,423 A | 9/1991 | German, Jr. |
| 5,066,526 A | 11/1991 | German, Jr. |
| 5,079,723 A | 1/1992 | Herceg et al. |
| 5,085,927 A * | 2/1992 | Dohrer ........................ 428/220 |
| 5,093,188 A | 3/1992 | Dohrer |
| 5,114,763 A | 5/1992 | Brant et al. |
| 5,141,809 A | 8/1992 | Arvedson et al. |
| 5,147,708 A | 9/1992 | Brant et al. |
| 5,154,981 A | 10/1992 | Brant et al. |
| 5,173,343 A | 12/1992 | Arvedson et al. |
| 5,208,096 A * | 5/1993 | Dohrer ........................ 428/218 |
| 5,212,001 A | 5/1993 | Brant et al. |
| 5,273,809 A | 12/1993 | Simmons |
| 5,292,560 A | 3/1994 | German |
| 5,334,428 A | 8/1994 | Dobreski et al. |
| 5,458,841 A | 10/1995 | Shirrell |
| 5,531,393 A | 7/1996 | Salzsauler et al. |
| 5,538,790 A | 7/1996 | Arvedson et al. |
| 5,741,389 A | 4/1998 | Yoshino |
| 5,752,362 A | 5/1998 | Eichbauer |
| 5,756,219 A | 5/1998 | Miro et al. |
| 5,789,029 A | 8/1998 | Ramsey et al. |
| 5,907,942 A | 6/1999 | Eichbauer |
| 5,907,943 A | 6/1999 | Eichbauer |
| 5,955,205 A * | 9/1999 | Ramsey et al. .............. 428/516 |
| 5,981,028 A | 11/1999 | Sugawa et al. |
| 6,083,611 A | 7/2000 | Eichbauer et al. |
| 6,093,480 A | 7/2000 | Eichbauer |
| 6,126,769 A | 10/2000 | Scharrenberg |
| 6,168,840 B1 | 1/2001 | Johnstone |
| 6,171,681 B1 * | 1/2001 | Mascarenhas et al. ....... 428/141 |
| 6,203,885 B1 * | 3/2001 | Sher et al. ................... 428/156 |
| 6,265,055 B1 | 7/2001 | Simpson et al. |
| 6,299,968 B1 | 10/2001 | Karaoglu et al. |
| 6,361,875 B1 | 3/2002 | Karaoglu et al. |
| 6,387,529 B1 | 5/2002 | Peet |
| 6,413,346 B1 | 7/2002 | Planeta et al. |
| 6,458,470 B1 | 10/2002 | DeLisio et al. |
| 6,492,010 B1 | 12/2002 | Karaoglu et al. |
| 6,495,245 B1 | 12/2002 | Karaoglu et al. |
| 6,509,090 B1 | 1/2003 | Hert |
| 6,534,173 B1 | 3/2003 | Hert |
| 6,592,699 B1 | 7/2003 | Mehta et al. |
| 6,602,598 B1 | 8/2003 | Simpson et al. |
| RE38,429 E | 2/2004 | Eichbauer |
| 6,692,805 B2 * | 2/2004 | Bonke ........................ 428/40.1 |
| 6,794,024 B1 | 9/2004 | Walton et al. |
| RE38,658 E | 11/2004 | Eichbauer |
| 6,942,909 B2 | 9/2005 | Shirrell et al. |
| 7,172,815 B2 | 2/2007 | Cook et al. |
| 7,226,655 B2 | 6/2007 | Iriya et al. |
| 2003/0189118 A1 | 10/2003 | Smith |
| 2005/0096613 A1 | 5/2005 | Carper et al. |
| 2006/0057410 A1 | 3/2006 | Saavedra et al. |
| 2006/0159943 A1 | 7/2006 | Brant et al. |
| 2006/0237883 A1 | 10/2006 | Jaeger |
| 2006/0243842 A1 | 11/2006 | Saldana Garcia |
| 2007/0292693 A1 | 12/2007 | Parkinson et al. |

OTHER PUBLICATIONS

Official Action dated Oct. 6, 2008, issued in U.S. Appl. No. 11/763,639, twelve pages.

* cited by examiner

*Primary Examiner*—David R Sample
*Assistant Examiner*—Lawrence D Ferguson
(74) *Attorney, Agent, or Firm*—Barnes & Thornburg LLP

(57) ABSTRACT

A multilayer stretch film having a high slip surface and an aggressive cling surface for wrapping items or loads for ease of transport is disclosed. In one embodiment, there is disclosed a multilayer film comprises a first surface having a coefficient of friction at least less than about 0.9, comprising at least polypropylene and high-density polyethylene, a second surface having a cling force to the first surface at least greater than about 5 g/in, comprising at least a styrenic block copolymer, and a core layer, positioned between the first surface and the second surface, comprising at least linear low-density polyethylene or its blend.

25 Claims, 1 Drawing Sheet

SLIP-CLING STRETCH FILM

CROSS-REFERENCE TO RELATED APPLICATIONS

This application is a continuation-in-part of U.S. patent application Ser. No. 11/763,639, filed on Jun. 15, 2007, which is incorporated herein by reference in its entirety.

BACKGROUND OF THE INVENTION

1. Field of the Invention

Embodiments of the present invention generally relate to a multilayer stretch film. More specifically, embodiments of the present invention relate to a multilayer stretch film having a high slip surface and an aggressive cling surface for wrapping items or loads for ease of transport.

2. Description of the Related Art

The use of thermoplastic stretch wrap films for the overwrap packaging of goods, and in particular, large rolls of paper or carpet, is a commercially significant application of polymer film. Monolayer stretch wrap films have identical surfaces on both sides, while multilayer stretch films can have a non-cling surface and a cling surface. The non-cling surface generally does not cling to itself and prevents adjoining wrapped goods from sticking to one another. The cling surface enables the film to stick to itself to prevent unwrapping during transport. However, as the non-cling surface decreases in coefficient of friction, the cling surface must increase its cling aggressiveness to enable the film to stick to itself when wrapped around goods.

Thus, there is a need for an improved slip-cling stretch film having a high slip surface and an aggressive cling surface.

SUMMARY OF THE INVENTION

Embodiments of the present invention relate to a multilayer stretch film having a high slip surface and an aggressive cling surface for wrapping items or loads for ease of transport.

In one embodiment, a multilayer film comprises a slip layer comprising at least polypropylene and high-density polyethylene blend, a cling layer comprising at least a styrenic block copolymer, and an intermediary layer comprising at least linear low-density polyethylene resin or its blend.

In another embodiment of the present invention, a multilayer film comprises a first surface having a coefficient of friction at least less than about 0.9, comprising at least polypropylene and high-density polyethylene, a second surface having a cling force to the first surface at least greater than about 5 g/in, comprising at least a styrenic block copolymer, and a core layer, positioned between the first surface and the second surface, comprising at least linear low-density polyethylene resin.

BRIEF DESCRIPTION OF THE DRAWING

So the manner in which the above recited features of the present invention can be understood in detail, a more particular description of embodiments of the present invention, briefly summarized above, may be had by reference to an embodiment, which is illustrated in the appended drawing. It is to be noted, however, the appended drawing illustrates only a typical embodiment of embodiments encompassed within the scope of the present invention, and, therefore, is not to be considered limiting, for the present invention may admit to other equally effective embodiments, wherein.

Figure 1:
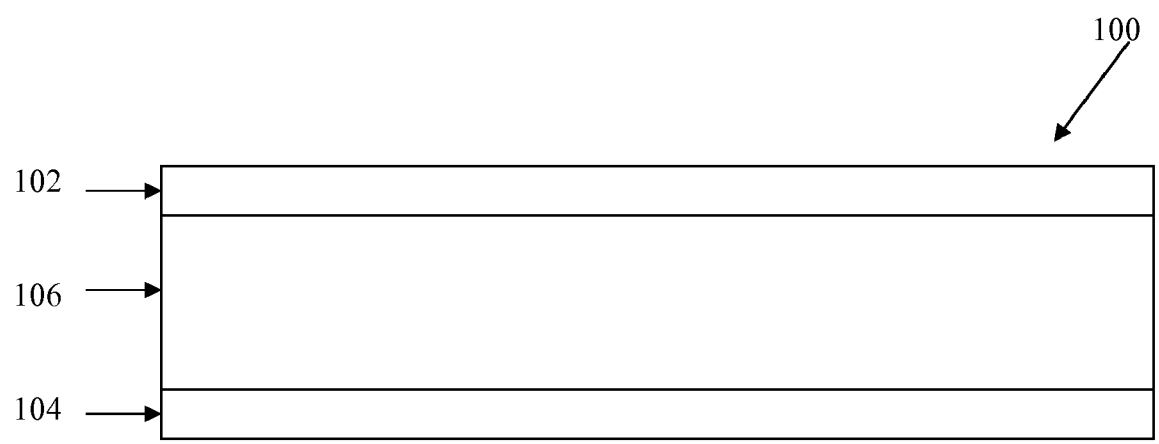
FIG. 1 depicts a cross-sectional view of a film in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the FIGURE.

DETAILED DESCRIPTION

FIG. 1 depicts a cross-sectional view of a film in accordance with one embodiment of the present invention. The film 100 generally comprises a slip layer 102, a cling layer 104, and at least one intermediary layer 106 (also referred to herein as a "core" layer) positioned between the two surface layers. The slip layer 102 comprises between about 5% by weight to about 20% by weight of the film 100. The cling layer 104 comprises between about 3% by weight to about 20% by weight of the film 100. In many of the embodiments, the balance of the film 100 is the intermediary layer 106.

The slip layer 102 generally comprises a polymer composition yielding a low coefficient of friction. The coefficient of friction of the slip layer 102 is at least less than about 0.9. In one embodiment, the coefficient of friction of the slip layer 102 is about 0.5.

The slip layer 102 generally comprises a polypropylene (PP) and high-density polyethylene (HDPE) composition. The PP may be provided in a range of about 60% by weight to about 99% by weight, and the balance of the composition comprises HDPE. In one embodiment, the PP is provided in about 80% by weight and the HDPE is provided in about 20% by weight of the slip layer 102. In another embodiment, the PP is provided in about 75% to about 95% by weight, the HDPE is provided in about 5% to about 25% by weight, and the balance comprises at least one resin or additive, such as abrasion-resistant resins, colorants, stabilizers, UV absorbers, and the like.

In one exemplary embodiment, the PP is a polypropylene homopolymer plastic material commercially available from the Huntsman Corporation of The Woodlands, Texas, under the name Huntsman Polypropylene H1200. The PP has a density of about 0.900 g/cm$^3$, and a mass-flow rate (MFR) of about 12 g/10 min, as determined by ASTM test methods D1505 and D1238, respectively.

In another exemplary embodiment, the HDPE is a high-density polyethylene plastic material, commercially available from the Westlake Chemical Corporation of Houston, Tex., under the name Westlake HDPE HC 6008. The HDPE has a density of about 0.962 g/cm$^3$, and a MFR of about 8.2 g/10 min, as determined by ASTM test methods D1505 and D1238, respectively.

The cling layer 104 generally comprises a polymer composition yielding a high cling. The cling force of the cling layer 104 to the slip layer 102, when wrapped around a good or load, is at least greater than about 5 g/in. In one embodiment, the cling force of the cling layer 104 to slip layer 102 is about 50 g/in.

The cling layer 104 generally comprises a styrenic block copolymer (SBC). The SBC may be provided in a range of about 50% by weight to about 100% by weight. In one embodiment, the SBC is provided in about 100% by weight of the slip layer 102. In another embodiment, the SBC is provided in about 50% to about 95% by weight, and the balance comprises at least an additional resin or additive, such as UV protective additives, puncture resistant resins, and the like.

In one exemplary embodiment, the SBC is a styrenic block copolymer material commercially available from Kraton Polymers LLC of Houston, Tex., under the name Kraton MD6718 Compound. The SBC has a density of about 0.9 g/cm$^3$, and a MFR of between about 2 g/10 min and about 25 g/10 min.

The cling layer 104 may further comprise additional resins and additives. In one embodiment, the cling layer 104 comprises a puncture-resistant resin. In another embodiment, the cling layer 104 may also comprise a low-density polyethylene (LDPE) resin having a density of between about 0.91 g/cm$^3$ and 0.94 g/cm$^3$, a LLDPE resin having a density of between about 0.915 g/cm$^3$ and 0.925 g/cm$^3$, or a very low-density polyethylene (VLDPE) resin having a density of between about 0.88 g/cm$^3$ and 0.915 g/cm$^3$.

Further examples of useful cling additives include polyisobutylenes (PIB) having a number average molecular weight in the range from about 1,000-3,000, preferably about 1,200-1,800, as measured by vapor phase osmometry, amorphous atactic polypropylenes, e.g., those having an average molecular weight of about 2,000, and polyterpenes. Examples of cling-enhancing resins include, but are not limited to, ethylene-vinyl acetate (EVA) copolymers containing from about 5% to about 15% by weight copolymerized vinyl acetate and VLDPE resins having densities from 0.88 g/cm$^3$ to 0.912 g/cm$^3$ and melt indexes from 0.5 g/10 min to 10 g/10 min. The optional cling additives may be present in the cling layer 104 in a concentration of from about 0.5% by weight to about 10% by weight of the cling layer 104 composition.

Optionally, in some embodiments, polyethylene resins are utilized in the cling layer 104, and are further blended with minor amounts, e.g., up to about 20% by weight total, of one or more other suitable resins to achieve a desired range of physical and/or mechanical properties in the film product. For example, suitable resins such as ethyl vinyl acetate copolymer, and LLDPE resins may be useful when blended with the cling layer 104. In many embodiments, conventional film additives such as antioxidants, UV stabilizers, pigments, dyes, etc., are utilized in the cling layer 104 of the film 100.

The intermediary layer 106 generally comprises one or more layers of polymeric compositions yielding necessary mechanical properties of the film 100, such as extensibility, load containment, tear and puncture resistance, and the like. In one embodiment, the intermediary layer 106 comprises a linear low-density polyethylene (LLDPE). In another embodiment, the intermediary layer 106 further comprises a white pigment such as titanium dioxide.

The LLDPE may be provided in a range of between about 50% and 100% by weight. In particular embodiments, the titanium dioxide may be provided between about 0.1% to about 5% by weight. In one embodiment, the LLDPE is provided in about 98% by weight, and the titanium dioxide is provided in about 2% by weight of the intermediary layer 106. In another embodiment, the composition may additionally comprise conventional additives, resins, and the like, to provide the desired performance characteristics.

In one exemplary embodiment, the LLDPE is a linear low-density polyethylene material commercially available from Dow Chemicals Company of Texas, under the name Dowlex 2247G. The LLDPE has a density of about 0.922 g/cm$^3$ and a MFR of about 1.0 g/10 min. The titanium dioxide is provided as an element of a white concentrate. In one embodiment, the titanium dioxide is contained within a white concentrate from Ampacet Corporation of Tarrytown, N.Y., under the name Ampacet White 110359-C.

Alternative embodiments of the present invention provide an intermediary layer 106 comprising at least two or more individual layers. It is understood that embodiments of the present invention may comprise as many individual layers in the intermediary layer 106 as necessary or feasible to achieve desired material properties in a film 100. For example, at least one embodiment of the present invention provides a three-layer film having a single intermediary layer, whereas an alternative embodiment provides for up to a fourteen layer film, having twelve individual layers in the intermediary layer. Additional embodiments provide for any number of layers contained within the range of the above-disclosed embodiments, as well as any number of layers feasible within the scope of the embodiments of the present invention.

The individual layers of the intermediary layer 106 may comprise various optional material compositions. Such materials include, but are not limited to, any feasible grade of LLDPE, metallocene-catalyzed LLDPE, Low-Density Polyethylene (LDPE), Mid-Density Polyethylene (MDPE), High-Density Polyethylene (HDPE), or Polypropylene (PP), including homopolymers, copolymers or blends of the above.

Additives and/or resins may be provided in the intermediary layer 106, such as those discussed above with respect to the slip layer 102 and the cling layer 104. Additional resins include polyolefin homopolymers and copolymers suitable for enhancement of mechanical properties such as tensile strength, elongation at break, tear and puncture resistance.

In order to ensure the film 100 meets the desired parameters in accordance with embodiments of the present invention, testing may be done to determine its physical properties. A parameter used to analyze the performance of such films is the force required to stretch the film to a desired percentage of its original length. This force is indicative of the load retention characteristics of the film. The films of embodiments of the present invention generally have a force to stretch the film to 100% of at least about 5 pli (pounds per linear inch). In many embodiments, the films generally have tensile strength of at least about 5000 psi and elongation to break of at least about 400%, as determined by ASTM D882.

Generally, embodiments of the film 100 are constructed according to conventional practices. The film 100 may be manufactured utilizing blown-film or cast-film co-extrusion. In one embodiment, a cast-film manufacturing process provides resin materials are heated to their molten state, and their viscosities are coordinated to prepare multilayer films in a uniform manner. The molten materials are conveyed to a co-extrusion adapter that combines the molten materials to form a multilayer co-extruded structure. The layered polymeric material is transferred through an extrusion die opened to a predetermined gap commonly in the range of between about 0.05 in (0.13 cm) and 0.012 in (0.03 cm). The material is then drawn down to the intended gauge thickness by means of a primary chill or casting roll maintained at between about 50° F. to about 130° F. Typical draw down ratios range from between about 5:1 to about 40:1.

The overall thickness of the stretch wrap film can vary widely according to end use specifications, but is generally in the range of the typical thicknesses for stretch wrap films. In one embodiment of the present invention, the overall film 100 thickness is between about 0.012 mm to about 0.125 mm. In one embodiment, the film 100 thickness is about 0.025 mm.

Once manufactured, in some embodiments, the slip layer 102 and/or the cling layer 104 of the film can be post-formation treated by implementing operations such as corona discharge, chemical treatment, flame treatment, etc., to modify the printability or ink receptivity of the surface(s) or to impart other desirable characteristics thereto.

In accordance with embodiments of the invention, the film may be provided in a non-stretched, i.e., unoriented, or merely a modestly stretched state prior to use. The film 100 is capable of being stretched from at least between about 40% and 400% during a final goods wrapping step.

In accordance with embodiments of the present invention, the film slip properties are unexpectedly improved as the film is stretched. These advantageous results may be a proximate result of the specific PP and HDPE compositions utilized in the slip layer with several embodiments of the present invention. Specifically, as the film is stretched, microscopic patterns appear on the slip layer film surface reducing film smoothness as well as the contact area. As a result, the slip surface of the described embodiments visibly loses its relatively glossy appearance when the film is stretched to about 100%. In one example, the static COF changed from about 0.65 before a stretch to about 0.49 after the stretch. As is understood by those of ordinary skill in the art, low friction is advantageous for ease of moving and for reduction of possible damage to items wrapped in a film in accordance with embodiments of the present invention.

While the foregoing is directed to embodiments of the present invention, other and further embodiments of the invention may be devised without departing from the basic scope thereof.

What is claimed is:

1. A multilayer stretch film comprising:
   a slip layer comprising at least polypropylene and high-density polyethylene blend;
   a cling layer comprising at least a styrene block copolymer material; and
   an intermediary layer comprising at least linear low-density polyethylene resin or its blend;
   wherein the cling layer comprises 60-100% styrene block copolymer material.

2. The multilayer stretch film of claim 1, wherein the intermediary layer further comprises titanium dioxide.

3. The multilayer stretch film of claim 1, wherein the slip layer comprises about 3% to about 20% by weight, the cling layer comprises about 5% to about 20% by weight, and the intermediary layer comprises about 60% to about 90% by weight.

4. The multilayer stretch film of claim 3, the slip layer comprises about 15% by weight, the cling layer comprises about 5% by weight, and the intermediary layer comprises about 80% by weight.

5. The multilayer stretch film of claim 1, wherein the slip layer has a coefficient of friction between about 0.3 to about 0.9, and wherein the cling layer has a cling force to the slip layer between about 5 g/in to about 80 g/in.

6. The multilayer stretch film of claim 5, wherein the slip layer has a coefficient of friction of about 0.5, and wherein the cling layer has a cling force to the slip layer of about 50 g/in.

7. The multilayer stretch film of claim 1, wherein the slip layer comprises between about 70% and about 99% by weight polypropylene and between about 1% to about 30% by weight high-density polyethylene.

8. The multilayer stretch film of claim 7, wherein slip layer comprises about 80% by weight polypropylene and about 20% by weight high-density polyethylene.

9. The multilayer stretch film of claim 1, wherein the intermediary layer comprises between about 50% and about 100% by weight linear low-density polyethylene.

10. The multilayer stretch film of claim 9, wherein the intermediary layer further comprises between about 0.1% to about 5% by weight titanium dioxide.

11. The multilayer stretch film of claim 10, wherein the intermediary layer comprises about 98% by weight linear low-density polyethylene and about 2% by weight titanium dioxide.

12. The multilayer stretch film of claim 1, wherein the multilayer film can withstand a force stretch of the film to about 400% at about 5000 psi.

13. The multilayer stretch film of claim 1, wherein the overall multilayer film thickness is between about 0.012 mm to about 0.125 mm.

14. The multilayer stretch film of claim 13, wherein the overall multilayer film thickness is about 0.025 mm.

15. The multilayer stretch film of claim 1, wherein the intermediary layer comprises at least two individual layers.

16. The multilayer stretch film of claim 15, wherein the at least two individual layers each comprise a material selected from the group consisting of Linear Low-Density Polyethylene, metallocene-catalyzed Low-Density Polyethylene, Low-Density Polyethylene, Mid-Density Polyethylene, High-Density Polyethylene, Polypropylene, and any homopolymers, copolymers or blend thereof.

17. A multilayer stretch film comprising:
   a first surface layer having a coefficient of friction at least less than about 0.9, comprising at least polypropylene and high-density polyethylene;
   a second surface layer having a cling force to the first surface layer at least greater than about 5 g/in, comprising at least a styrenic block copolymer; and
   a core layer, positioned between the first surface layer and the second surface layer, comprising at least linear low-density polyethylene resin;
   wherein the second surface layer comprises 60-100% styrene block copolymer material.

18. The multilayer stretch film of claim 17, wherein the coefficient of friction of the first surface layer is about 0.5, and wherein the cling force of the second surface layer to the first surface layer is about 50 g/in.

19. The multilayer stretch film of claim 17, wherein the first surface layer comprises about 5% to about 20% by weight, the second surface layer comprises about 3% to about 20% by weight, and the core layer comprises about 60% to about 90% by weight.

20. The multilayer stretch film of claim 17, wherein the first surface layer comprises about 15% by weight, the second surface layer comprises about 5% by weight, and the core layer comprises about 80% by weight.

21. The multilayer stretch film of claim 17, wherein the first surface layer comprises between about 75% and about 99% by weight polypropylene and between about 1% to about 25% by weight high-density polyethylene.

22. The multilayer stretch film of claim 21, wherein first surface layer comprises about 80% by weight polypropylene and about 20% by weight high-density polyethylene.

23. The multilayer stretch film of claim 17, wherein the second surface layer comprises between about 80% and 100% by weight of a styrene block copolymer.

24. The multilayer stretch film of claim 17, wherein the core layer comprises between about 50% and 100% by weight linear low-density polyethylene.

25. The multilayer stretch film of claim 24, wherein the core layer further comprises between about 0.1% to about 5% by weight titanium dioxide.

* * * * *

UNITED STATES PATENT AND TRADEMARK OFFICE
CERTIFICATE OF CORRECTION

| | | |
|---|---|---|
| PATENT NO. | : 7,611,768 B2 | Page 1 of 1 |
| APPLICATION NO. | : 11/941425 | |
| DATED | : November 3, 2009 | |
| INVENTOR(S) | : Alexander Tukachinsky | |

It is certified that error appears in the above-identified patent and that said Letters Patent is hereby corrected as shown below:

On title page, items (12) and (75), Inventor, the inventor's last name should be changed from "Tukachinksy" to "Tukachinsky".

Signed and Sealed this

Sixteenth Day of February, 2010

David J. Kappos
*Director of the United States Patent and Trademark Office*